(12) United States Patent
Mangino et al.

(10) Patent No.: US 7,349,465 B2
(45) Date of Patent: Mar. 25, 2008

(54) LINE INTERFACE SYSTEM

(75) Inventors: Alfred Mangino, Lambertville, NJ (US); Ojas M. Choksi, North Brunswick, NJ (US); Faramarz Sabouri, Lawrenceville, NJ (US)

(73) Assignee: Analog Devices, Inc., Norwood, MA (US)

( * ) Notice: Subject to any disclaimer, the term of this patent is extended or adjusted under 35 U.S.C. 154(b) by 702 days.

(21) Appl. No.: 10/787,652

(22) Filed: Feb. 26, 2004

(65) Prior Publication Data

US 2005/0113034 A1    May 26, 2005

Related U.S. Application Data

(60) Provisional application No. 60/524,073, filed on Nov. 21, 2003.

(51) Int. Cl.
*H04B 1/38* (2006.01)
(52) U.S. Cl. .................. 375/220; 375/222; 375/297; 375/318
(58) Field of Classification Search ........... 375/220, 375/297, 318; 455/80, 121; 327/307, 362; 330/260
See application file for complete search history.

(56) References Cited

U.S. PATENT DOCUMENTS

| | | | |
|---|---|---|---|
| 4,331,842 A | | 5/1982 | Kiko et al. |
| 4,555,599 A | | 11/1985 | Hackett-Jones et al. |
| 5,105,163 A | * | 4/1992 | Voorman ............. 330/107 |
| 5,699,016 A | * | 12/1997 | Federspiel et al. ....... 330/260 |
| 6,356,582 B1 | * | 3/2002 | Mazer et al. ............ 375/219 |
| 6,459,323 B2 | * | 10/2002 | Birkeli .................. 327/333 |
| 6,903,593 B2 | * | 6/2005 | Wang ................... 327/307 |
| 2002/0151280 A1 | * | 10/2002 | Sabouri et al. ........... 455/80 |
| 2003/0109239 A1 | | 6/2003 | Sabouri et al. | |

FOREIGN PATENT DOCUMENTS

EP    1111865    6/2001

OTHER PUBLICATIONS

"A 740mW ADSL Line Driver for Central Office with 75dB MTPR," Sabouri et al., *Solid-State Circuits Conference* vol. 1, pp. 322-470 (2002).

* cited by examiner

*Primary Examiner*—Shuwang Liu
*Assistant Examiner*—Kabir A Timory
(74) *Attorney, Agent, or Firm*—Gauthier & Connors LLP

(57) ABSTRACT

A transceiver system is disclosed for use in a telecommunication system. The transceiver system includes a transmission circuit with a differential transmitter input coupled via a transmitter input stage to a differential input of a transmission amplifier in an embodiment. The transmitter input stage includes a trimmable resistor, one end of which is coupled to a positive transmit input signal, and the other end of which is coupled to a negative transmit input signal. The transceiver system also includes a receiver circuit with a differential receiver output coupled to a differential input of a receiver amplifier, and further includes a transmission line interface circuit coupled to a differential output of said transmission amplifier and to a differential input of said receiver amplifier. In accordance with other embodiments, the receiver amplifier includes an input stage that includes a first plurality of capacitors and a feedback circuit that includes a second plurality of capacitors.

14 Claims, 2 Drawing Sheets

LINE INTERFACE SYSTEM

This application claims priority to U.S. Provisional Patent Application Ser. No. 60/524,073 filed Nov. 21, 2003.

BACKGROUND OF THE INVENTION

The present invention generally relates to the field of transceivers for telecommunication systems, and particularly relates to transceivers for telecommunication systems that are efficient and inexpensive to produce.

Transceivers for telecommunication systems typically include a transmit path and a receive path. The transmit path typically includes a transmitter amplifier stage and a line driver, and the receive path typically includes a receiver amplifier stage that is coupled to the transmission line of the transmit path. Many transceivers provide for some type of noise rejection. For example, U.S. Published Patent Application No. 2003/0109239 published on Jun. 12, 2003 discloses a transceiver circuit that provides a second order high pass transfer function to reject out-of-band noise and distortion components.

As telecommunication systems become smaller and more ubiquitous, there continues to be a need for a transceiver circuit that is efficient and inexpensive to produce. There is further a need for a transceiver circuit that reduces required surface area in printed circuit boards. Moreover, during manufacture of such circuits it is often necessary to precisely trim certain resistors to ensure the accuracy of the circuits. Laser trimming of resistors consumes a significant portion of manufacturing time and costs. For example, U.S. Published Patent Application No. 2002/0151280 published on Oct. 17, 2002 discloses a transceiver circuit that provides a single matching impedance and includes resistors at the input stage of the transmitter path as well as the output stage of the receive path. The transceiver circuits disclosed therein, however, generally require that up to six resistors may need to be trimmed in each of the transmit path and the receive path, and that external capacitors may be required to couple the transmit circuit (which may operate at +12 volts to −12 volts) to the receive circuit (which may operate at +12 volts to ground).

There is a need, therefore, for a transceiver circuit that may be more efficiently and economically manufactured and processed.

SUMMARY OF THE INVENTION

The invention provides a transceiver system for use in a telecommunication system. The transceiver system includes a transmission circuit with a differential transmitter input coupled via a transmitter input stage to a differential input of a transmission amplifier in an embodiment. The transmitter input stage includes a trimmable resistor, one end of which is coupled to a positive transmit input signal, and the other end of which is coupled to a negative transmit input signal. The transceiver system also includes a receiver circuit with a differential receiver output coupled to a differential input of a receiver amplifier, and further includes a transmission line interface circuit coupled to a differential output of said transmission amplifier and to a differential input of said receiver amplifier. In accordance with other embodiments, the receiver amplifier includes an input stage that includes a first plurality of capacitors and a feedback circuit that includes a second plurality of capacitors. In further embodiments, the first plurality of capacitors may each be selectable capacitors.

BRIEF DESCRIPTION OF THE DRAWINGS

The following description may be further understood with reference to the accompanying drawing in which.

The drawings are shown for illustrative purposes.

DETAILED DESCRIPTION OF THE ILLUSTRATED EMBODIMENTS

The invention provides an architecture for a subscriber line interface that includes a transmit path and a receive path. In accordance with an embodiment, the transmit path includes a variable resistor across the differential transmit input, a line driver and a single matching network terminating the line. The voltage across the matching network is bootstrapped to the receive signal through multiple negative feedbacks so that the terminating impedance appears much larger than its actual value from the point of view of the receiver. The matching impedance, on the other hand, manifests itself as a small impedance to the transmit signal and as a result, dissipates only a small fraction of the transmit power. The transfer function of the line driver is shaped as a first-order high-pass filter to reject any out-of-band noise and distortion components. The single-matching-impedance nature of this architecture results in a significant printed circuit board area, cost reduction and power savings.

The receive path includes a hybrid network and a low noise programmable-gain capacitive receive amplifier in accordance with an embodiment of the invention. The hybrid network acts as a selective filter and prevents the transmit signal echo from leaking into the receive path, thereby limiting the dynamic range. The capacitive receive amplifier subtracts the signal across the line from a replica of the transmit signal in order to reject the transmit signal and amplify the received signal from the line.

A typical application for transceivers in accordance with various embodiments of the invention may include use as a full-rate asymmetrical digital subscriber line (ADSL) modem for a central office. This architecture may be easily applied to other applications by appropriate modifications. The architecture reduces the number of resistors that need to be trimmed, the number of external components and costly, bulky capacitors, leading to substantial cost savings without sacrificing performance in terms of transmit gain, receive gain, hybrid rejection, line termination and noise.

A line driver architecture in accordance with an embodiment provides a matched output impedance to the line and achieves a high-efficiency operation. It may be implemented in single-ended or fully-differential architectures and may be used with voltage or current feedback amplifiers. Even when used as a fully-differential amplifier, it requires only a single matching impedance leading to a significant space saving on the printed circuit board. The matching impedance is typically 10% of the line characteristic impedance.

Figure 1:
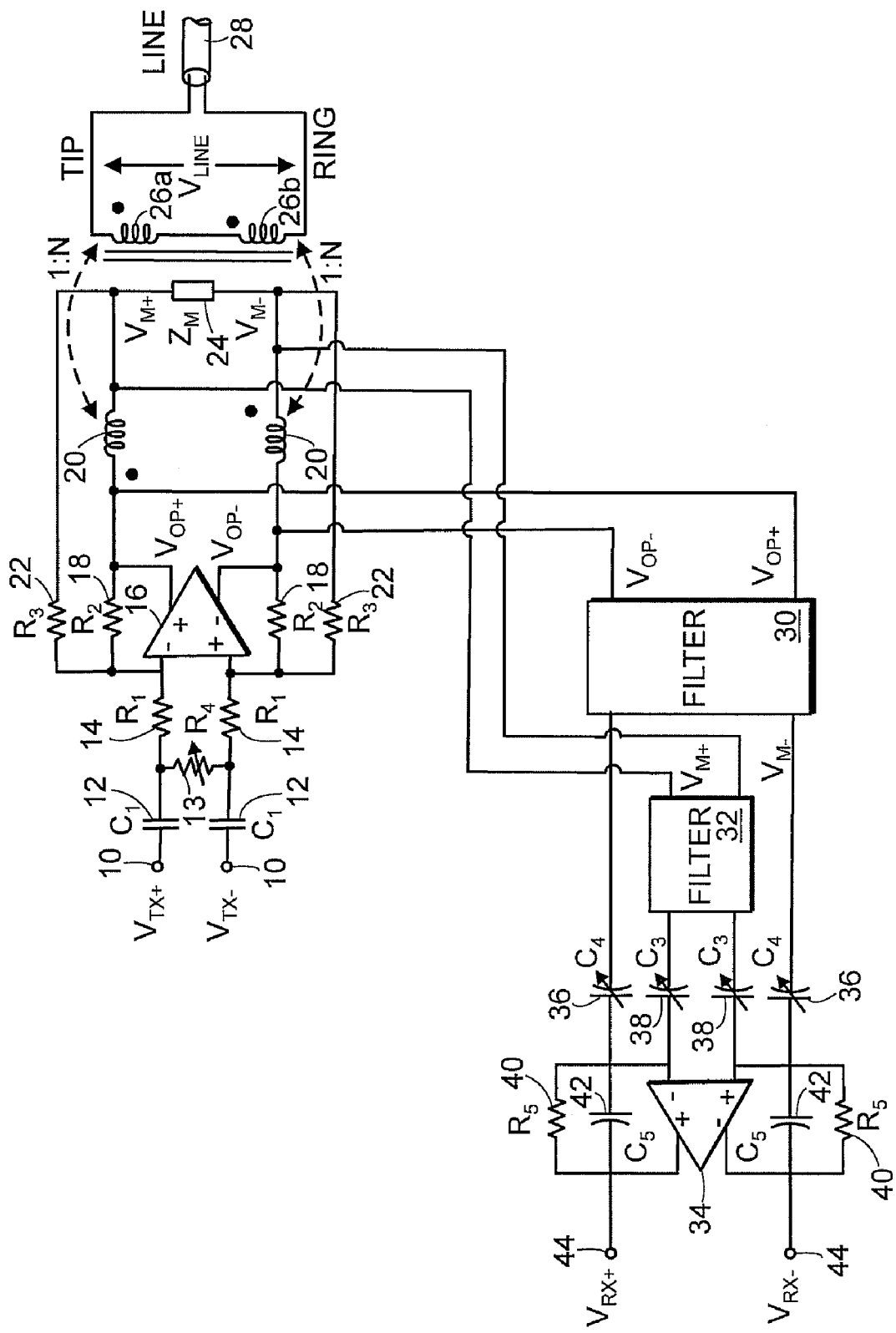
FIG. 1 shows an illustrative view of a transceiver circuit in accordance with an embodiment of the invention.

As shown in FIG. 1, a transceiver circuit in accordance with an embodiment of the invention for use as a modem front end may include a line driver, a single transformer hybrid, a matching impedance, and a receive path amplifier. The line driver is implemented with a fully-differential voltage-feedback structure with a single matching impedance and first order high-pass transfer function. The transmission path includes a pair of capacitors $12$ ($C_1$) and a pair of resistors $14$ ($R_1$) in the input path from a transmission input port 10 to a transmitter amplifier 16, as well as a trimmable resistor 13 coupled between the input paths. A first feedback path from the output of the amplifier 16 includes a pair of resistors 18 ($R_2$). The output of the amplifier 16 is serially passed through the primary winding 20 of the transformer, and a second amplifier feedback path from across the matching network 24 includes another pair of resistors 22 ($R_3$) as shown.

The circuit further includes a small matching impedance 24 ($Z_M$), and the circuit is coupled to a transmission line 28 via the secondary windings 26a and 26b of the transformer. The impedance $Z_M$ may be comprised of a wide variety of circuit elements in various embodiments such as a single resistor or two or more resistors and/or capacitors in series, and may include fixed zero or non-zero reference voltages. The dual negative-feedback network boosts the small-signal impedance of the matching network ($Z_m$) to a much larger line driver output impedance in order to match the characteristic impedance of the transmission line. Matched termination of the line improves transmission efficiency for the received signal. While the matching impedance manifests itself significantly larger to the received signal, it appears with its actual value for the transmit signal. As a result, by using a small matching impedance, only a small fraction of the total power is consumed by the matching impedance and an efficient operation is achieved.

The receive path of the transceiver circuit of FIG. 1 includes a first filter 30 that is coupled to the output of the amplifier 16, and an optional second filter 32 that is coupled to the voltage across the matching network 24. The filters 30 and 32 may be provided by a variety of filter networks. The outputs of the first filter 30 are input to a receiver amplifier 34 through series capacitors 36 ($C_4$), and the outputs of the second filter 32 are input to the amplifier 34 through series capacitors 38 ($C_3$). The capacitors 36 and 38 are each selectable to achieve a desired gain. The negative feedback path from each input to each output of the amplifier 34 includes a series resistor 40 ($R_5$) and a capacitor 42 ($C_5$), and the output of the amplifier 34 is provided to a receiver output port 44 as shown.

Resistors $R_1$, $R_2$ and $R_3$ set the gains from the input ($V_{TX}$) to the opamp output ($V_{OP}$) and also to the voltage across the line ($V_{LINE}$). The received signal from the line appears across the transformer primary. In addition, the transmit signal appears across the same windings. When the matching impedance ($Z_m$) is a fraction of the line impedance ($Z_L$), there is a unique linear combination of the voltages across the opamp output ($V_{OP}$) and the matching impedance ($V_M$) which leads to complete rejection of the transmit echo from the receive path. The same signal path is used by the signal received from the line to reach the receive amplifier. The received signal usually faces some attenuation that should be compensated by low-noise amplification in the receive path. Capacitors $C_1$ in FIG. 1 implement a first-order high pass filter at no additional cost, noise and power consumption.

The ratio of the matching impedance to the line characteristic impedance is:

$$k = Z_M/(Z'_L) \quad (1)$$

where $Z'_L = Z_L/N^2$ is the total reflected line impedance as seen from the primary side of the transformer. In the above equation, N represents the turns ratio of each primary of the transformer to each secondary as shown in FIG. 1. The impedance of the matching network is optimized to match the characteristic impedance of the line times a scaling factor as shown in Equation (1) above.

The voltage gain from line driver input to the opamp is provided by:

$$\frac{V_{OP}}{V_{TX}} = \frac{-\left(\frac{R_2}{R_1}\right)}{\left[1 + \left(\frac{k}{k+1}\right)\left(\frac{R_2}{R_3}\right)\right]} \quad (2)$$

The voltage gain from line driver input to line is provided by:

$$\frac{V_{LINE}}{V_{TX}} = \left(\frac{N}{k+1}\right)\frac{V_{OP}}{V_{TX}} \quad (3)$$

For optimal hybrid rejection of the transmit signal and amplification of the received signal from the line, $V_{OP}$ and $V_M$ are combined linearly as:

$$V_{RX} = AV_{OP} - V_M \quad (4)$$

where $V_{RX}$ is the voltage at the receiver output. The optimum gain A for complete rejection of the transmit signal is:

$$A = k/(k+1) \quad (5)$$

The receive path gain is provided by:

$$\frac{V_{RX}}{V_{LINE}} = \frac{1}{N}\left(\frac{AR_2 + R_3}{R_2 + R_3}\right) = \frac{2k}{N(k+1)} \quad (6)$$

The output impedance of the line driver seen from the line is provided by:

$$Z_i = N^2 Z_M \left(1 + \frac{R_2}{R_3}\right) \quad (7)$$

In order to match the output impedance of the line driver (expressed by Equation (7)) to the line characteristic impedance ($Z_L$), we need to have:

$$\frac{R_2}{R_3} = \frac{1}{k} - 1 \quad (8)$$

The receive path of the line interface includes two filters and a difference amplifier. For a transmission line with well-defined characteristic impedance, the impedance of the matching network should be simply a scaled reflected-to-primary impedance ($Z_L'$) of the transmission line. For such a well-behaved case, constructing a simple matching network is routine; and as long as Equation (5) is valid, the hybrid rejection is perfect. The four input difference amplifier shown in FIG. 1 without the input filter implements Equation (4) by setting appropriate values for the input resistors.

If the self-inductance of the transformer winding makes an impedance comparable to the reflected line impedance ($Z_L'$), an inductor should be placed in parallel with the above matching impedance as well. The matching impedance should be:

$$Z_M = k(Z'_L \| 4L_1 s) \quad (9)$$

where $L_1$ is the inductance of each primary of the transformer when the other two windings are left open (FIG. 1).

Unfortunately, the characteristic impedance of many of the transmission lines is not as well defined. For example, with a twisted-pair telephony transmission line, the characteristic impedance may vary depending on the wire gauge, the length of the line and the number of bridge taps. Realization of an impedance network with perfect matching to all the lines is impossible. In order to achieve reasonable transmit signal rejection from the receive path, the voltage across the matching impedance may be filtered as shown in FIG. 1.

During manufacturing of integrated circuits, it takes a few seconds to trim each resistor in order to set a desired corner frequency or the desired value. This results in an increase in the overall cost. An advantage of a system in accordance with the above embodiment is that the desired corner frequency is set just by trimming one resistor $R_4$ instead of trimming the $R_1$, $R_2$ and $R_3$ resistor pairs. Also, the fact that the receive amplifier input section is capacitive leads to a further reduction in the number of resistors that need to be trimmed. Thus the input-referred noise due to receive amplifier is lower. The input-referred noise due to feedback resistor $R_5$ may be made lower by increasing its value.

Moreover, in order to reduce the cost and to achieve a smaller printed circuit board area, it is desirable to reduce the use of large and expensive capacitors from the architecture. The use of the capacitive amplifier avoids the need for the use of external capacitors to couple the transmit path (which typically operates at +12 volts to −12 volts) to the receive path (which operates at +12 volts to ground). Further, programmable-gain function may be implemented in the receive difference amplifier without the need for redundant hardware, just by changing the capacitor ratio.

Figure 2:
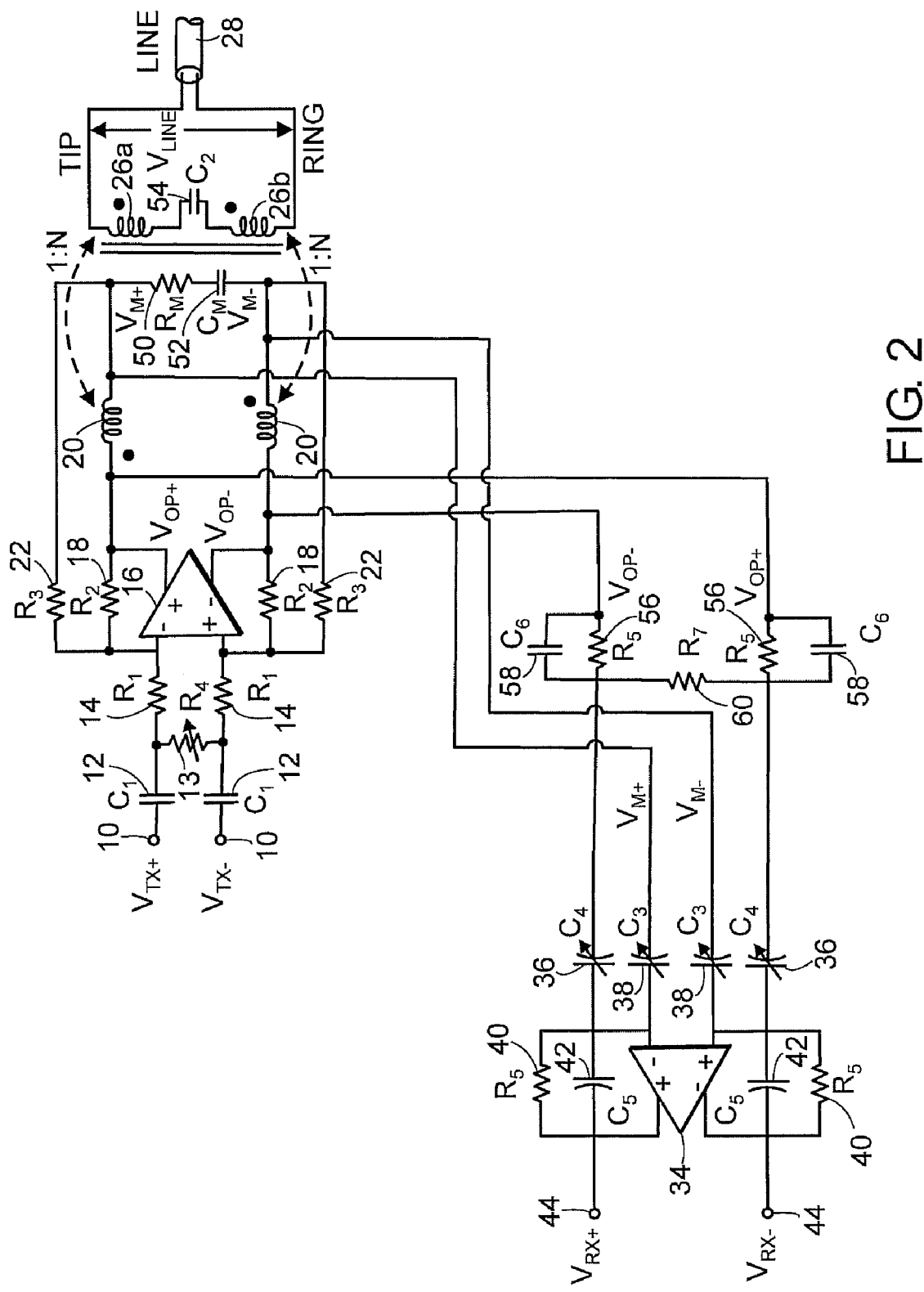
FIG. 2 shows an illustrative view of a transceiver circuit in accordance with another embodiment of the invention.

FIG. 2 shows an example of a system in accordance with another embodiment of the invention as may be used in an ADSL full-rate central office modem. The system includes in the transmission path an amplifier 16 with capacitors 12, variable resistor 13, and resistors 14 in the input path from port 10, and feedback resistors 18 and 22 on either side of inductors 20 as discussed above with reference to FIG. 1. The system of FIG. 2 also includes in the receiver path an amplifier 34 coupled to a port 44 and having feedback resistors 40 and capacitors 42 that are coupled to variable capacitors 36 and 38 as discussed above with reference to FIG. 1.

The transceiver circuit of FIG. 2 further includes an impedance network that includes a resistor 50 ($R_m$) in series with a capacitor 52 ($C_m$) across $V_M$. The line side of the transformer coupling includes two windings 26a and 26b on either side of a capacitor 54 ($C_2$). The receiver circuit includes a specific embodiment of a filter 30 as shown in FIG. 1 including resistors 56 ($R_6$), capacitors 58 ($C_6$), and resistor 60 ($R_7$).

Those skilled in the art will appreciate that numerous modifications and variations may be made to the above disclosed embodiments without departing from the spirit and scope of the invention.

What is claimed is:

1. A transceiver system for use in a telecommunication system, said transceiver system comprising:
    a transmission circuit including a differential transmitter input coupled via a transmitter input stage to a differential input of a transmission amplifier, said transmitter input stage including a trimmable resistor, one end of which is coupled to a positive transmit input, and the other end of which is coupled to a negative transmit input, said trimmable resistor providing a desired corner frequency to be set by adjusting the trimmable resistor;
    a receiver circuit including a differential receiver output coupled to a differential input of a receiver amplifier, dual negative feedback paths, a first differential input path having a first pair of capacitors, and a second differential input path having a second pair of capacitors, said first and second differential input paths providing first and second differential input signals from first and second filters respectively to the receiver amplifier; and
    a transmission line interface circuit coupled to a differential output of said transmission amplifier and to a differential input of said receiver amplifier.

2. The system as claimed in claim 1, wherein said receiver amplifier includes a capacitor in each negative feedback path.

3. The system as claimed in claim 1, wherein said first pair of capacitors are adjustable capacitors that are coupled to the differential input of said receiver amplifier and are coupled to the first filter.

4. The system as claimed in claim 1, wherein said first pair of capacitors are coupled to the differential input of said receiver amplifier and to a differential output of the transmission amplifier in series with the first filter.

5. The system as claimed in claim 4, wherein said second pair of capacitors are coupled to the differential input of said receiver amplifier into the transmission line interface circuit in series with the second filter.

6. The system as claimed in claim 1, wherein said receiver circuit includes a first capacitor in parallel with a resistor in a first feedback path of said receiver amplifier.

7. The system as claimed in claim 6, wherein said receiver circuit includes a second capacitor in parallel with a resistor in a second feedback path of said receiver amplifier.

8. A transceiver system for use in a telecommunication system, said transceiver system comprising:
    a transmission circuit including a differential transmitter input coupled to a differential input of a transmission amplifier, said differential transmitter input including a trimmable resistor, one end of which is coupled to a positive transmit input and the other end of which is coupled to a negative transmit input of said transmission amplifier, said trimmable resistor providing a desired corner frequency to be set by adjusting the trimmable resistor;
    a receiver circuit including a differential receiver output coupled to a differential input of a receiver amplifier, said receiver amplifier including an input stage that includes a first plurality of adjustable capacitors that couple a first differential input signal from a first filter to said receiver amplifier, and a second plurality of adjustable capacitors that couple a second differential input signal from a second filter to said receiver amplifier, and a feedback circuit that includes a plurality of capacitors; and
    a transmission line interface circuit coupled to a differential output of said transmission amplifier and to a differential input of said receiver amplifier.

9. The system as claimed in claim 8, wherein said first plurality of adjustable capacitors are coupled in series with the first filter, which is coupled to the differential output of the transmission amplifier, and the second plurality of adjustable capacitors are coupled in series with the second filter which is coupled to the transmission line interface circuit.

10. The system as claimed in claim 8, wherein said feedback circuit of said receiver circuit further includes a plurality of feedback resistors, each of which is in parallel with a feedback capacitor.

11. A transceiver system for use in a telecommunication system, said transceiver system comprising:
- a transmission circuit including a differential transmitter input coupled via a transmitter input stage to a differential input of a transmission amplifier, said transmitter input stage including a trimmable resistor, one end of which is coupled to a positive transmit input, and the other end of which is coupled to a negative transmit input said trimmable resistor providing a desired corner frequency to be set by adjusting the trimmable resistor;
- a receiver circuit including a differential receiver output coupled to a differential input of a receiver amplifier, said receiver amplifier including an input stage that includes a first pair of adjustable capacitors that couple a first differential input signal from a first filter in series to said receiver amplifier, and a second pair of adjustable capacitors that couple a second differential input signal from a second filter to said receiver amplifier, and a feedback circuit that includes a second plurality of capacitors; and
- a transmission line interface circuit coupled to a differential output of said transmission amplifier and to a differential input of said receiver amplifier.

12. The circuit as claimed in claim 11, wherein said first pair of adjustable capacitors are coupled via the first filter to an output of the transmission amplifier.

13. The circuit as claimed in claim 12, wherein said second pair of adjustable capacitors are coupled via the second filter to the transmission line interface circuit.

14. The circuit as claimed in claim 11, wherein said feedback circuit of said receiver circuit includes two feedback loops, each including a capacitor and a resistor.

* * * * *